April 23, 1968  T. O. MARINI ET AL  3,379,451
UTILITY CART
Filed Oct. 19, 1965
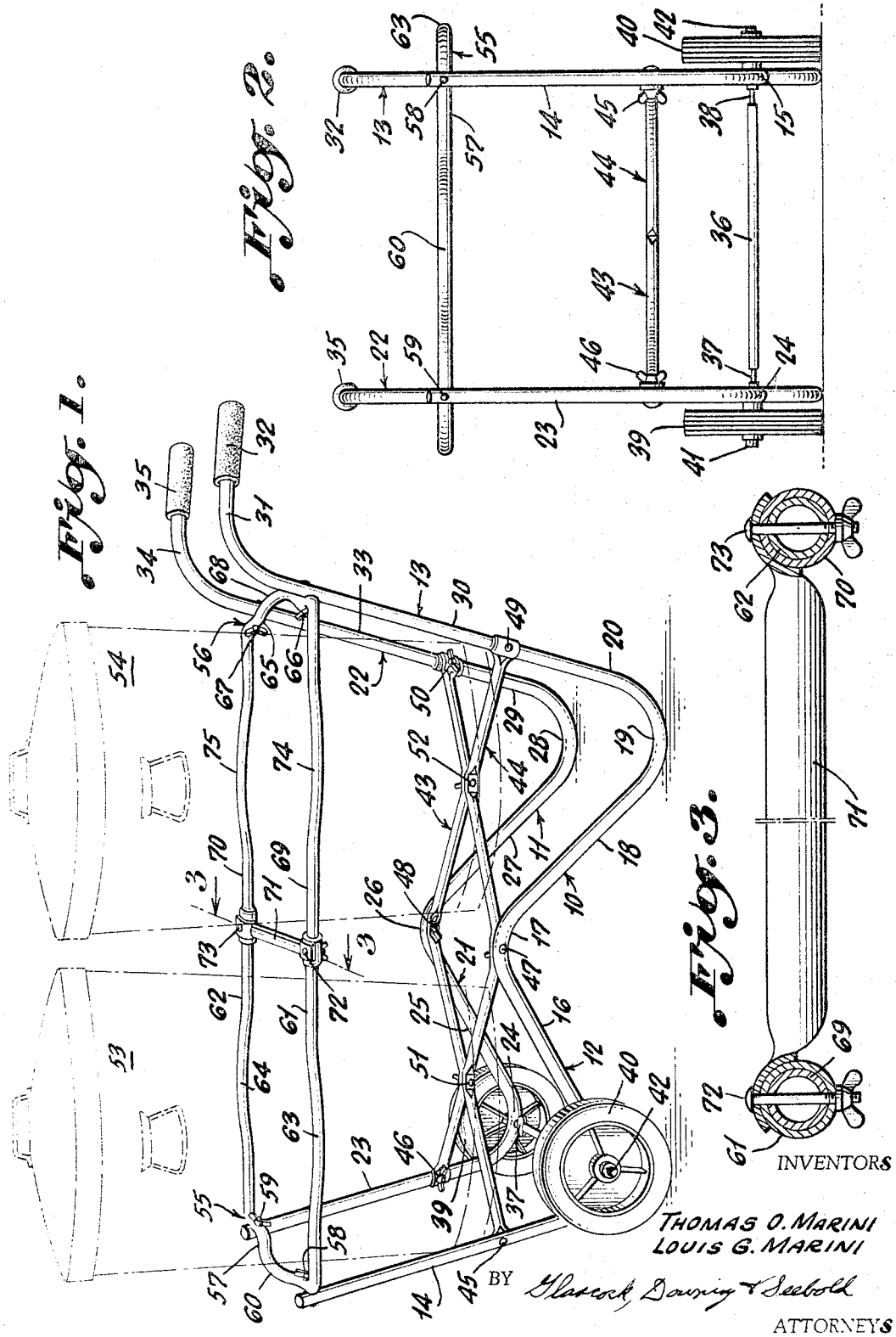
INVENTORS
THOMAS O. MARINI
LOUIS G. MARINI
BY Glascock, Downing & Seebold
ATTORNEYS 3,379,451
UTILITY CART
Thomas O. Marini, 1500 Prospect Blvd., Haddon Heights,
N.J. 08035, and Louis G. Marini, 316 Springhouse
Lane, Moorestown, N.J. 08057
Filed Oct. 19, 1965, Ser. No. 497,833
2 Claims. (Cl. 280—47.19)

This invention relates to transportation and more particularly to a utility cart made up of preformed tubular structural elements which may be conveniently assembled and disassembled and in which the cart may be conveniently packed and shipped in a knock-down condition and this invention is an improvement over that disclosed and claimed in our prior Patent #3,111,333 dated Nov. 19, 1963.

The utility cart of this invention is particularly designed for domestic use and may serve to hold and transport trash or garbage containers or for any other transportation use to which the same may be adapted and while numerous carts of this general type have heretofore been proposed and utilized, the cart of this invention is particularly well adapted for the use intended and may also very conveniently be disassembled for ease of storage and re-assembled when required without the use of special tools or any particular mechanical skill.

It is accordingly an object of the invention to provide a utility cart made up of pre-formed tubular structural elements which is light in weight and which may be conveniently assembled and disassembled without the use of special tools.

A further object of the invention is the provision of a utility cart, particularly designed to support and transport generally cylindrical containers, such as trash and garbage containers, but which may be also utilized for supporting and transporting other types of containers.

A still further object of the invention is the provision of a utility cart made up of preformed tubular structural elements and in which such elements may be conveniently packed and shipped in a knock-down condition and thereafter, quickly and conveniently assembled by the user.

Another object of the invention is the provision of a utility cart, including a pair of ground engaging wheels mounted on an axle and in which portions of the cart extend outwardly of the outer ends of the axle in order to prevent engagement of the outer ends of the axle with the sides of a gate or other objects through which the cart may be moved.

Further objects and advantages of the invention will be apparent from the following description, taken in conjunction with the accompanying drawing wherein:

FIG. 1 is a view in perspective showing the utility cart of this invention, together with a pair of containers disposed therein and indicated in dotted outline;

FIG. 2, a front elevational view of the cart shown in FIG. 1; and

FIG. 3, a sectional view taken substantially on the line 3—3 of FIG. 1 and showing one of the details of construction.

With continued reference to the drawing, there is shown a utility cart constructed in accordance with this invention and which may be conveniently made up of tubular structural elements in order to provide sufficient strength and also at the same time, to provide a lightweight vehicle which is economical to construct. The cart, as shown in the drawing, comprises a pair of spaced identical side frame members 10 and 11 and as clearly shown in FIGS. 1 and 2, the side frame member 10 comprises a body section 12 and a handle section 13, the body section 12 comprising an upwardly and forwardly disposed front member 14 terminating at the lower end in a front curved portion 15 which merges into a rearwardly and upwardly inclined front side member 16. The front side member 16 terminates in a central curved portion 17 which merges into a rearwardly and downwardly inclined rear side member 18 which terminates in a rear curved portion 19 disposed below the front curved portion 15 to provide a rear ground-engaging cart support. The rear curved portion 19 merges into a rearwardly and upwardly extending rear member 20 which terminates at the same height as the central curved portion 17.

In a similar manner, the other side frame member 11 comprises a body section 21 and a handle section 22 and the body section 21 comprises an upwardly and forwardly disposed front member 23 terminating at the lower end in a front curved portion 24 merging into a rearwardly and upwardly inclined front side member 25. The front side member 25 terminates in a central curved portion 26 merging into a rearwardly and downwardly inclined rear side member 27 which terminates in a rear curved portion 28 disposed below the front curved portion 24 and together with the rear curved portion 19 provides a pair of rear ground engaging cart supports. The rear curved portion 28 merges into a rearwardly and upwardly extending rear member 29 terminating at the same height as the central curved portion 26.

The handle section 13 comprises a handle member 30 telescopically received on the upper end of the rear member 20 and extending upwardly and rearwardly with the handle member 30 terminating in a horizontal portion 31 having a hand-grip 32 secured thereon. In a similar manner, the handle section 22 comprises a handle member 33 telescopically received on the upper end of the rear member 29 and extending upwardly and rearwardly to merge into a horizontal portion 34 having a hand-grip 35 secured thereon.

The front curved portions 15 and 24 are provided with aligned apertures therein which serve to removably receive an axle 36 which projects outwardly of the side frame members 10 and 11. The axle 36 is provided with spaced enlarged portions 37 and 38 which may be formed by providing flattened areas on the axle 36 and the enlarged portions 37 and 38 engage the inner sides of the side frame members 10 and 11 to retain the same in spaced relation. Ground engaging wheels 39 and 40 are rotatably mounted on the outer ends of the axle 36 outwardly of the side frame members 10 and 11 and friction caps 41 and 42 received on the outer ends of the axle 36 serve to removably retain the wheels 39 and 40 thereon and also serve to prevent spreading of the side frame members 10 and 11.

A lower horizontal load supporting and bracing frame may well comprise a pair of identical tubular members 43 and 44 connected to the front members 14 and 23 by any suitable fastening means, such as bolts and wing nuts 45 and 46 and also to the central curved portions 17 and 26 by suitable fastening means, such as bolts and wing nuts 47 and 48. The members 43 and 44 are also connected to the rear members 20 and 29 at the point of juncture between such rear members and the handle sections 13 and 22 by suitable fastening means, such as bolts and wing nuts 49 and 50. Midway between the front members 14 and 23 and the central curved portions 17 and 26, the tubular members 43 and 44 are connected together, either by a rivet or by a bolt and wing nut 51 and in a similar manner, midway between the central curved portions 17 and 26 and the rear members 20 and 29 the tubular members 43 and 44 are connected together by a rivet or by a bolt and wing nut 52. This arrangement serves to provide a double X structure which serves both as a bracing means for the side frame members and also as a support for containers to be transported by the cart of this invention and typical containers are shown in dotted outline at 53 and 54 in FIG. 1.

The cart of this invention also includes an upper horizontal frame comprising front and rear generally U-shaped sections 55 and 56. The front section 55 includes a crossbar 57 extending between and detachably secured to the front members 14 and 23 adjacent the upper ends by suitable fastening means, such as bolts and wing nuts 58 and 59. The crossbar 57 may be provided with an outwardly curved portion 60 to at least partially conform to the contour of the container 53. The legs 61 and 62 of the front section 55 extend rearwardly and are provided with outwardly curved portions 63 and 64 which partially conform to the contour of the container 53 and these portions 63 and 64 also project outwardly beyond the outer ends of the axle 36 as clearly shown in FIG. 2. This feature serves to prevent engagement of the outer ends of the axle 36 with the sides of a gate or other opening through which the cart may be moved, since any opening which will provide clearance for the outwardly projecting curved portions 63 and 64 of the upper horizontal frame will permit passage of the ends of the axle 36.

The rear section 56 of the upper horizontal frame is provided with a crossbar 65 extending between and detachably connected to the handle sections 13 and 22 by suitable fastening means, such as bolts and wing nuts 66 and 67. The crossbar 65 is provided with an outwardly curved portion 68 which at least partially conforms to the contour of the container 54. The legs 69 and 70 of the rear section 56 extend forwardly and telescopically engage with the rearwardly extending legs 61 and 62 of the front section 55. At the point of juncture between the front section 55 and the rear section 56 a cross member 71 extends therebetween and is secured to the legs 61 and 62, as well as the legs 69 and 70 by suitable fastening means, such as bolts and wing nuts 72 and 73. It is also to be noted that the legs 69 and 70 of the rear section 56 are provided with outwardly curved portions 74 and 75 which partially conform to the contour of the container 54.

It will thus be seen that by the above described invention there has been provided a utility cart of relatively simple and economical construction, yet one which is of light-weight and sufficient strength for the purpose intended and moreover, the design permits packing and shipping of the cart in a knock-down condition which may be conveniently assembled by the user without the use of special tools or any particular mechanical skill.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A utility cart formed of tubular structural elements which may be conveniently assembled and dis-assembled, said cart comprising a pair of spaced identical side frame members, each frame member comprising a body section and a handle section detachably secured together, said body section comprising an upwardly and forwardly disposed front member terminating at the lower end in a front curved portion merging into a rearwardly and upwardly inclined front side member, said front side member terminating in a central curved portion merging into a rearwardly and downwardly inclined rear side member, said rear side member terminating in a rear curved portion disposed below said front curved portion to provide ground engaging rear cart support means, said rear curved portion merging into a rearwardly and upwardly extending rear member terminating at the same height as said central curved portion, said handle section comprising a handle member detachably received on the upper end of said rear member and extending upwardly and rearwardly and terminating in a generally horizontal portion having a hand-grip thereon, said front curved portions having aligned apertures therein, an axle removably received in said apertures and projecting outwardly of said side frame members, said axle having spaced flattened areas inwardly of its respective outer ends to define enlarged portions on said axle engaging the inner sides of said side frame members to retain the same in spaced relations, ground engaging wheels mounted on said axle outwardly of said side frame members, friction caps received on the outer ends of said axle to removably retain said wheels thereon, a lower horizontal load supporting and bracing frame comprising a pair of identical tubular members detachably connected to said front members, to said central curved portions and to said rear members at the point of juncture with said handle members, said tubular members extending inwardly and being secured together intermediate said front members and said central curved portions and intermediate said central curved portions and said rear members to provide a double X structure, and an upper horizontal frame comprising front and rear generally U-shaped sections, said front section having a crossbar extending between and detachably secured to said front members adjacent the upper end, the legs of said front section extending rearwardly with at least a portion thereof projecting outwardly beyond the outer end of said axle, said rear section having a crossbar extending between and detachably secured to said handle members, the legs of said rear section extending forwardly and being detachably secured to the legs of said front section, a horizontal cross member detachably secured to the legs of said front and rear section at the point of juncture therebetween, and the legs of said front and rear section including portions which extend outwardly beyond the outer ends of the axle whereby said outer ends would not engage any gate or opening of a size to accommodate the transverse dimensions of the legs.

2. A utility cart as defined in claim 1 in which the elements are detachably secured together by bolts and wing nuts.

References Cited
UNITED STATES PATENTS

| 2,687,895 | 8/1954 | Rutledge | 280—47.26 |
| 2,723,864 | 11/1955 | Schierman | 280—47.19 |
| 2,855,210 | 10/1958 | Joyce | 280—47.19 |
| 2,868,557 | 1/1959 | Klipp et al. | 280—47.13 |
| 3,111,333 | 11/1963 | Marini et al. | 280—47.19 |

BENJAMIN HERSH, *Primary Examiner.*

J. A. PEKAR, *Assistant Examiner.*